(12) United States Patent
Kamepalli (10) Patent No.: US 6,425,025 B1
(45) Date of Patent: Jul. 23, 2002

(54) SYSTEM AND METHOD FOR CONNECTING ELECTRONIC CIRCUITRY IN A COMPUTER SYSTEM

(75) Inventor: Srinivas Rao Kamepalli, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/325,688

(22) Filed: Jun. 3, 1999

(51) Int. Cl.$^7$ .............................................. G06F 13/00
(52) U.S. Cl. ..................... 710/100; 710/62; 710/300; 710/305; 324/71.1; 324/525; 324/713; 326/30; 326/82; 326/86; 326/90
(58) Field of Search ................... 710/62, 100, 300, 710/305; 326/30, 86, 90, 82; 324/71.1, 525, 713

(56) References Cited

U.S. PATENT DOCUMENTS

| | | |
|---|---|---|
| 4,748,426 A | 5/1988 | Stewart |
| 4,841,232 A | 6/1989 | Graham et al. |
| 5,099,137 A | 3/1992 | Lattin, Jr. |
| 5,313,595 A | 5/1994 | Lewis et al. |
| 5,434,516 A | 7/1995 | Kosco |
| 5,467,453 A | 11/1995 | Kocis |
| 5,473,264 A * | 12/1995 | Mader et al. .................. 326/30 |
| 5,510,701 A | 4/1996 | Samela et al. |
| 5,536,176 A * | 7/1996 | Borchew et al. .............. 439/61 |
| 5,550,990 A | 8/1996 | Keener et al. |
| 5,553,250 A * | 9/1996 | Miyagawa et al. ......... 710/129 |
| 5,583,448 A | 12/1996 | Corder et al. |
| 5,613,074 A * | 3/1997 | Galloway .................... 710/100 |
| 5,680,555 A * | 10/1997 | Bodo et al. .................. 710/126 |
| 5,706,447 A | 1/1998 | Vivio |
| 5,721,497 A | 2/1998 | Novak |
| 5,768,622 A | 6/1998 | Lory et al. |
| 6,041,373 A * | 3/2000 | Pham .......................... 710/62 |

* cited by examiner

*Primary Examiner*—Rupal Dharia
(74) *Attorney, Agent, or Firm*—Haynes and Boone, LLP (57) ABSTRACT

A bus includes at least a pair of terminators interposed between a pair of connectors. A first one of the terminators is located within a predetermined distance from a first one of the connectors. A second one of the terminators is located within the predetermined distance from a second one of the connectors. The second terminator is selectively disabled in response to the second terminator being interposed between the first terminator and a third terminator of the bus.

20 Claims, 6 Drawing Sheets

SYSTEM AND METHOD FOR CONNECTING ELECTRONIC CIRCUITRY IN A COMPUTER SYSTEM

BACKGROUND

The disclosures herein relate in general to information processing systems and in particular to a system and method for connecting electronic circuitry in a computer system.

A small computer system interface ("SCSI") bus is one technique for communicating information and signals (e.g. interfacing or bridging) between a central processing unit ("CPU") and other devices (e.g. hard drives). A SCSI bus can include terminators and connectors. The portion of a SCSI bus between terminators forms a bus path.

If a portion of the SCSI bus is not bounded by terminators, such portion forms a stub. According to the SCSI specification, the maximum physical length of a stub is restricted to 0.1 meter. Such a restriction imposes limits on bus routing, and on the placement of terminators and connectors.

Accordingly, a need has arisen for a system and method for connecting electronic circuitry in a computer system, in which various shortcomings of previous techniques are overcome. More particularly, a need has arisen for a system and method for connecting electronic circuitry in a computer system, in which fewer limits are imposed on bus routing, and on the placement of terminators and connectors.

SUMMARY

One embodiment, accordingly, provides for a bus that includes at least a pair of terminators interposed between a pair of connectors. A first one of the terminators is located within a predetermined distance from a first one of the connectors. A second one of the terminators is located within the predetermined distance from a second one of the connectors. The second terminator is selectively disabled in response t6 the second terminator being interposed between the first terminator and a third terminator of the bus.

A principal advantage of this embodiment is that (a) various shortcomings of previous techniques are overcome, and (b) fewer limits are imposed on bus routing, and on the placement of terminators and connectors.

DETAILED DESCRIPTION

Figure 1:
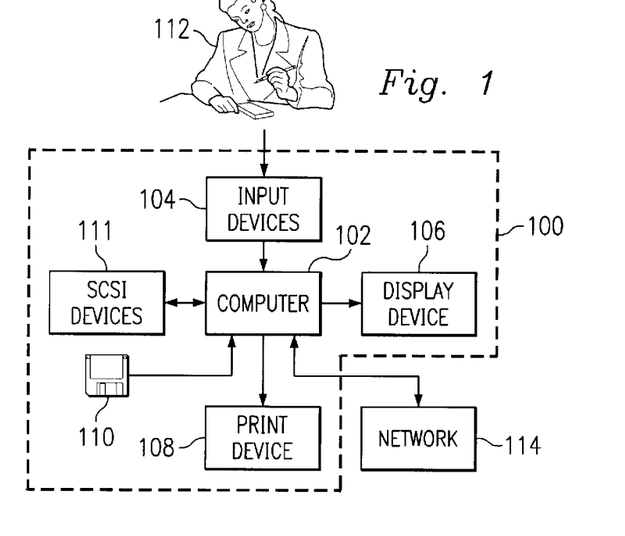
FIG. 1 is a block diagram of a computer system according to the illustrative embodiment.

FIG. 1 is a block diagram of a computer system, indicated generally at 100, according to the illustrative embodiment. System 100 includes input devices 104, a display device 106, a print device 108, and a computer 102 for executing processes and performing operations (e.g. communicating information) in response thereto as discussed further hereinbelow. In the illustrative embodiment, system 100 is an IBM-compatible portable personal computer ("PC") that executes Microsoft Windows 95 operating system ("OS") software, or alternatively is any computer that executes any OS. All Microsoft products identified herein are available from Microsoft Corporation, One Microsoft Way, Redmond, Wash. 98052-6399, telephone (425) 882-8080.

Computer 102 is connected to input devices 104, display device 106 and print device 108. Print device 108 is, for example, a conventional electronic printer or plotter. Also, computer 102 includes internal speakers for outputting audio signals. In an alternative embodiment, the speakers are external to computer 102. Moreover, system 100 includes (a) a first computer-readable medium (or apparatus) 110 which is a floppy diskette and (b) SCSI devices 111 such as a computer hard disk drive controller (and the associated hard disk operated by it) which is a second computer-readable medium (or apparatus).

A human user 112 and computer 102 operate in association with one another. For example, in response to signals from computer 102, display device 106 displays visual images, and user 112 views such visual images. Also, in response to signals from computer 102, print device 108 prints visual images on paper, and user 112 views such visual images. Further, user 112 operates input devices 104 in order to output information to computer 102, and computer 102 receives such information from input devices 104.

Input devices 104 include, for example, a conventional microphone, a conventional electronic keyboard, and a pointing device such as a conventional electronic "mouse", rollerball or light pen. User 112 operates the keyboard to output alphanumeric text information to computer 102, and computer 102 receives such alphanumeric text information from the keyboard. User 112 operates the pointing device to output cursor-control information to computer 102, and computer 102 receives such cursor-control information from the pointing device. The microphone translates audio frequencies into electronic signals, and computer 102 translates the electronic signals into digital information.

A network 114 includes a network local area network ("LAN") control manager server computer ("LCM"). For communicating with (i.e. outputting information to, and receiving information from) network 114 (including the LCM), computer 102 includes a network interface card ("NIC") which is yet another type of computer-readable medium (or apparatus) connected to computer 102.

Figure 2:
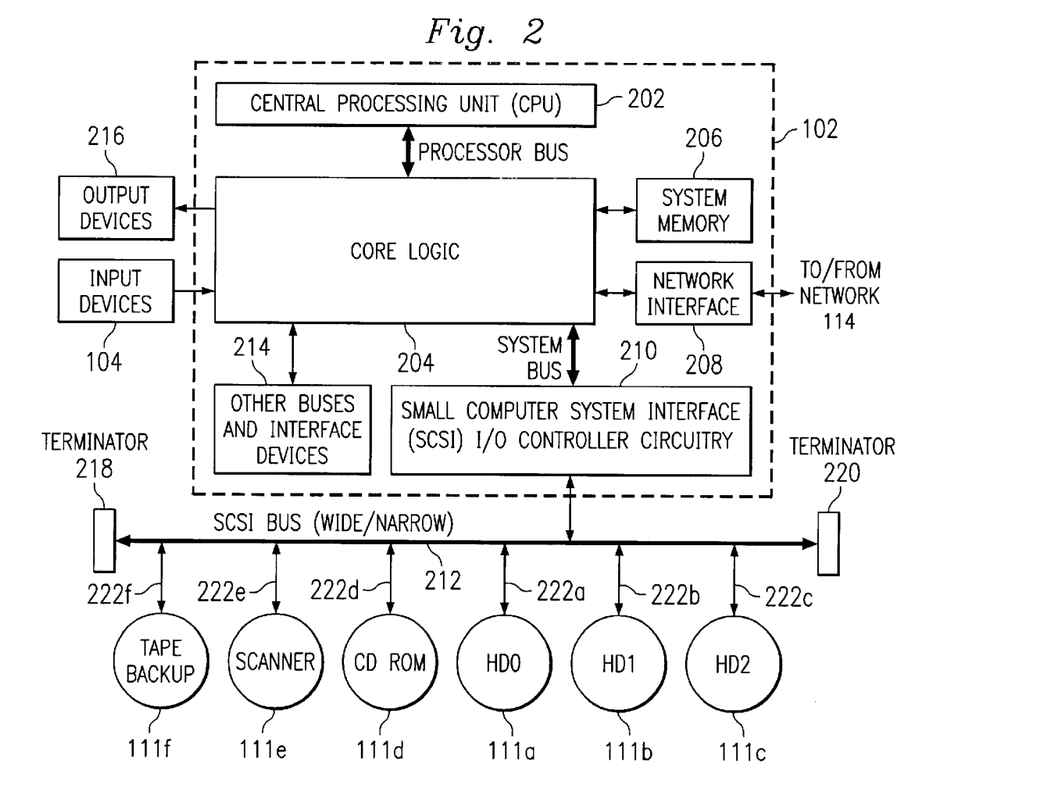
FIG. 2 is a block diagram of a computer of the computer system of FIG. 1.

FIG. 2 is a block diagram of computer 102, which is formed by various electronic circuitry components. In the example of FIG. 2, such electronic circuitry components reside on a system printed circuit board ("PCB"). As shown in FIG. 2, the electronic circuitry components of computer 102 include (a) a central processing unit ("CPU") 202 for executing and otherwise processing instructions, (b) core logic 204, also referred to as a "host bus bridge," which includes electronic circuitry for communicating information and signals (e.g. interfacing or bridging) between CPU 202 and other electronic circuitry and devices, (c) a system memory 206 such as random access memory device ("RAM") and read only memory device ("ROM") for storing information (e.g. instructions executed by CPU 202 and data operated upon by CPU 202 in response to such instructions), (d) a network interface 208 (e.g. Ethernet, token ring, fiber distributed data interface ("FDDI"), and/or asynchronous transfer mode ("ATM") circuitry) for communicating information and signals between core logic 204 and network 114, (e) small computer system interface ("SCSI") input/output ("I/O") controller circuitry 210 for communicating information and signals between core logic 204 and a SCSI bus 212, and (f) miscellaneous other buses and interface devices 214 (e.g. video camera, floppy diskette 110 of FIG. 1) for performing other operations of computer 102. Also, computer 102 may include various other electronic circuitry components that, for clarity, are not shown in FIG. 2.

In the example of FIG. 2, core logic 204 includes other I/O controller circuitry for receiving information and signals from input devices 104 and for outputting information and signals to output devices 216 (e.g. speakers, display device 106 and print device 108 of FIG. 1). Also, in the example of FIG. 2, core logic 204 includes a basic input/output system ("BIOS") electrically erasable programmable read only memory device ("EEPROM") for storing firmware information (e.g. instructions). In response to such firmware information, computer 102 operates its various components, as for example by outputting and responding to interrupt requests ("IRQs").

As shown in FIG. 2, core logic 204 is connected to (a) CPU 202 through a bi-directional processor bus and (b) SCSI I/O controller circuitry 210 through a bi-directional system bus (e.g. peripheral component interface ("PCI") bus). Also, core logic 204 is connected to input devices 104, system memory 206, network interface 208, other buses and interface devices 214, and output devices 216, as shown in FIG. 2. Accordingly, core logic 204 communicates information and signals between CPU 202, SCSI I/O controller circuitry 210, input devices 104, system memory 206, network interface 208, other buses and interface devices 214, and output devices 216.

In a significant aspect of the illustrative embodiment, SCSI I/O controller circuitry 210 is connected to a bi-directional SCSI bus 212. SCSI bus 212 includes terminators 218 and 220. As shown in FIG. 2, SCSI bus 212 is connected to various SCSI devices 111 such as a first hard drive ("HD0") 111a, a second hard drive ("HD1") 111b, a third hard drive ("HD2") 111c, a compact drive ROM ("CD-ROM") 111d, an optical scanner device 111e, and a tape backup device 111f. Although not shown in FIG. 2, each of SCSI devices 111a–f is connected to SCSI bus 212 through a respective associated connector.

In the illustrative embodiment, SCSI bus 212 is (a) a multi-pin bus that includes a 32-bit data bus, or (b) a 68-pin wide bus that includes a 16-bit data bus, or (c) a 50-pin narrow bus that includes an 8-bit data bus. Also, SCSI bus 212 includes voltage supply line(s) ("power"), voltage reference line(s) ("ground"), and control lines. Each of hard drives 111a–c includes a respective hard disk drive controller (and the associated hard disk operated by it).

The portion of SCSI bus 212 between terminators (e.g. terminators 218 and 220 in FIG. 2) forms a bus path. If a portion of SCSI bus 212 is not bounded by terminators, such portion forms a stub. According to the SCSI specification, the maximum physical length of a stub is restricted to 0.1 meter. For example, in FIG. 2, the maximum physical length of any of stubs 222a–f is restricted to 0.1 meter, such as between SCSI device 111a and its respective associated connector to the bus path of SCSI bus 212. Such a restriction imposes limits on bus routing, and on the placement of terminators and connectors.

Figure 3:
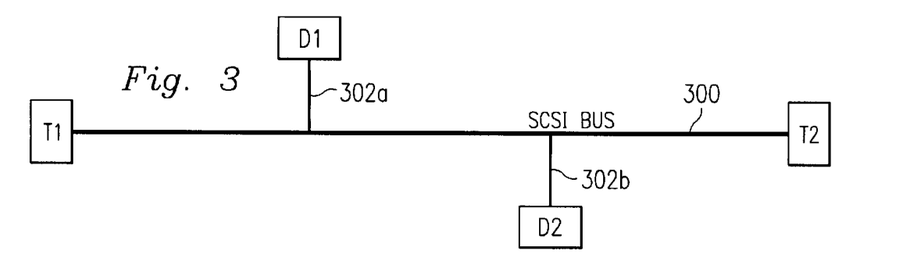
FIG. 3 is a block diagram of a first SCSI bus.

FIG. 3 is a block diagram of a SCSI bus 300. Although not shown in FIG. 3, each of SCSI devices D1 and D2 is connected to SCSI bus 300 through a respective associated connector. SCSI device D1, for example, may be a device controller such as a hard disk drive controller.

In FIG. 3, the portion of SCSI bus 300 between terminators T1 and T2 forms a bus path. Accordingly, in FIG. 3, the maximum physical length of any of stubs 302a and 302b is restricted to 0.1 meter, such as between SCSI device D1 and its respective associated connector to the bus path of SCSI bus 300. As discussed further hereinbelow in connection with FIGS. 4 through 7, such a restriction imposes limits on bus routing, and on the placement of terminators and connectors.

Figure 4:
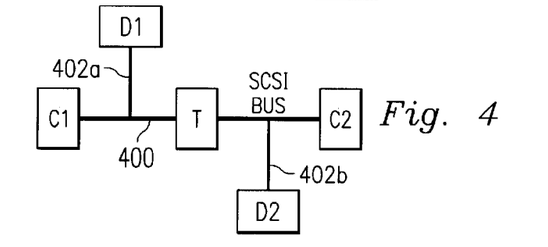
FIG. 4 is a block diagram of a second SCSI bus.

FIG. 4 is a block diagram of a SCSI bus 400. Although not shown in FIG. 4, each of SCSI devices D1 and D2 is connected to SCSI bus 400 through a respective associated connector. In FIG. 4, the portion of SCSI bus 400 between terminator T and a connector C1 is not fully bounded by terminators, because connector C1 is not interposed between terminator T and a second terminator. Accordingly, such portion forms a stub.

Likewise, the portion of SCSI bus 400 between terminator T and a connector C2 is not fully bounded by terminators, because connector C2 is not interposed between terminator T and a second terminator. Accordingly, such portion forms a stub. According to the SCSI specification, the maximum physical length of each stub (e.g. between T and C1, and likewise between T and C2) is restricted to 0.1 meter. Similarly, the maximum physical length of any of stubs 402a and 402b is restricted to 0.1 meter, such as between SCSI device D1 and its respective associated connector to the bus path of SCSI bus 400. Such a restriction imposes limits on bus routing, and on the placement of terminators and connectors.

Figure 5:
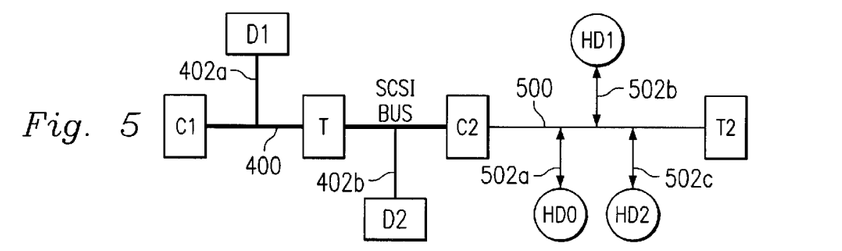
FIG. 5 is a block diagram of a first alternative version of the SCSI bus of FIG. 4.
Figure 6:
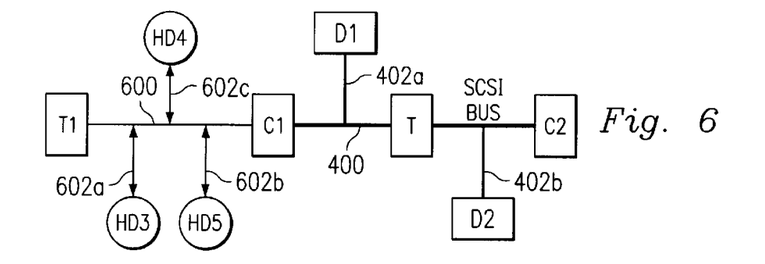
FIG. 6 is a block diagram of a second alternative version of the SCSI bus of FIG. 4.
Figure 7:
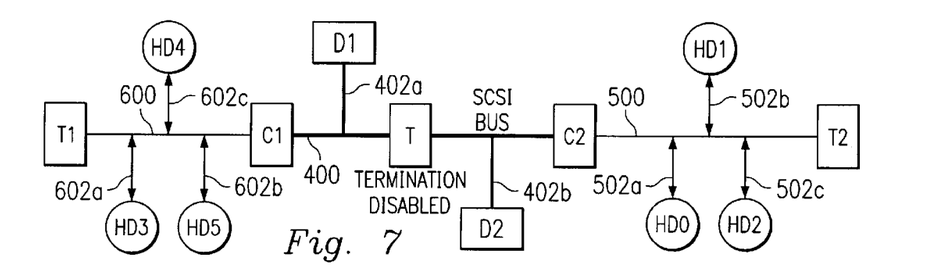
FIG. 7 is a block diagram of a third alternative version of the SCSI bus of FIG. 4.

FIGS. 5 through 7 are block diagrams of alternative versions of SCSI bus 400.

In FIG. 5, a cable 500 is connected to connector C2, such that cable 500 forms a portion of SCSI bus 400. Although not shown in FIG. 5, each of SCSI devices HD0, HD1 and HD2 (which are hard drives) is connected to cable 500 through a respective associated connector. Up to sixteen SCSI devices (including hard drives HD0, HD1 and HD2, plus devices D1 and D2 which may also, for example, be hard drives) may be so connected to SCSI bus 400.

As shown in FIG. 5, the portion of SCSI bus 400 between terminator T and a terminator T2 is fully bounded by terminators (e.g. connector C2 is interposed between terminator T and the second terminator T2). Accordingly, such portion forms a bus path, and cable 500 may have a physical length substantially greater than 0.1 meter. But the maximum physical length of any of stubs 502*a*, 502*b* and 502*c* is restricted to 0.1 meter, such as between SCSI device HD0 and its respective associated connector to the bus path of SCSI bus 400.

In FIG. 6, a cable 600 is connected to connector C1, such that cable 600 forms a portion of SCSI bus 400. Although not shown in FIG. 6, each of SCSI devices HD3, HD4 and HD5 (which are hard drives) is connected to cable 600 through a respective associated connector. Up to sixteen SCSI devices (including hard drives HD3, HD4 and HD5, plus devices D1 and D2 which may also, for example, be hard drives) may be so connected to SCSI bus 400.

As shown in FIG. 6, the portion of SCSI bus 400 between terminator T and a terminator T1 is fully bounded by terminators (e.g. connector C1 is interposed between terminator T and the second terminator T1). Accordingly, such portion forms a bus path, and cable 600 may have a physical length substantially greater than 0.1 meter. But the maximum physical length of any of stubs 602*a*, 602*b* and 602*c* is restricted to 0.1 meter, such as between SCSI device HD3 and its respective associated connector to the bus path of SCSI bus 400.

In FIG. 7, cable 500 (of FIG. 4) is connected to connector C2, and cable 600 (of FIG. 5) is connected to connector C1, such that cables 500 and 600 form a portion of SCSI bus 400. Notably, in FIG. 7, SCSI bus 400 includes three terminators (i.e. terminators T, T1 and T2). According to the SCSI specification, SCSI bus 400 may physically include more than two terminators, but a maximum of two terminators may be electrically enabled at any moment. Accordingly, in FIG. 7, terminator T is electrically disabled, and terminators T1 and T2 are electrically enabled, as discussed further hereinbelow in connection with FIGS. 12 through 14.

As shown in FIG. 7, the portion of SCSI bus 400 between terminator T1 and terminator T2 is fully bounded by terminators (e.g. connectors C1 and C2 are interposed between first terminator T1 and second terminator T2). Accordingly, such portion forms a bus path, and cables 500 and 600 are not restricted to a maximum physical length of 0.1 meter. Nevertheless, the maximum physical length between T and C1, and likewise between T and C2, is restricted to 0.1 meter, in order to preserve the option of either attaching or detaching cables 500 and/or 600 under various situations as shown in FIGS. 4 through 7. This restriction imposes undesirable limits on the number of SCSI devices that may be connected to SCSI bus 400 between connectors C1 and C2.

FIGS. 8 through 11 are block diagrams of alternative versions of SCSI bus 212 of the illustrative embodiment. For clarity, FIGS. 2 and 8 through 11 show a subset of the SCSI devices actually connected to SCSI bus 212. Moreover, any of the terminators shown in FIGS. 8 through 11 is capable of operating as terminator 218 or terminator 220 in FIG. 2.

Figure 8:
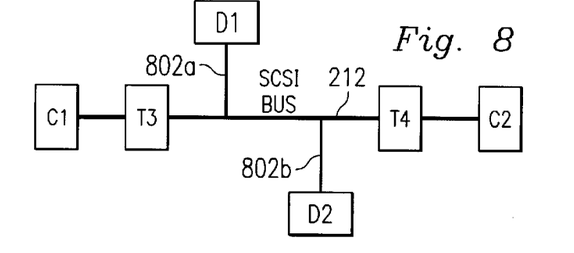
FIG. 8 is a block diagram of a SCSI bus of the computer of FIG. 2.

In a significant aspect of the illustrative embodiment, in FIG. 8, the portion of SCSI bus 212 between a terminator T3 and a terminator T4 is fully bounded by terminators, and such portion accordingly forms a bus path. Conversely, the portion of SCSI bus 212 between terminator T3 and a connector C1 is not fully bounded by terminators, because connector C1 is not interposed between terminator T3 and a second terminator. Accordingly, such portion forms a stub with a maximum physical length restricted to 0.1 meter.

Likewise, the portion of SCSI bus 212 between terminator T4 and a connector C2 is not fully bounded by terminators, because connector C2 is not interposed between terminator T4 and a second terminator. Accordingly, such portion forms a stub with a maximum physical length restricted to 0.1 meter. Similarly, the maximum physical length of any of stubs 802*a* and 802*b* is restricted to 0.1 meter, such as between SCSI device D1 and its respective associated connector to the bus path of SCSI bus 212.

In a significant aspect of the illustrative embodiment, in comparison to SCSI bus 400 (of FIGS. 4 through 7), more SCSI devices (in addition to D1 and D2) may be connected to SCSI bus 212 (of FIGS. 8 through 11) between connectors C1 and C2. This is because the portion of SCSI bus 212 between terminators T3 and T4 forms a bus path, which may have a physical length substantially greater than 0.1 meter.

Figure 9:
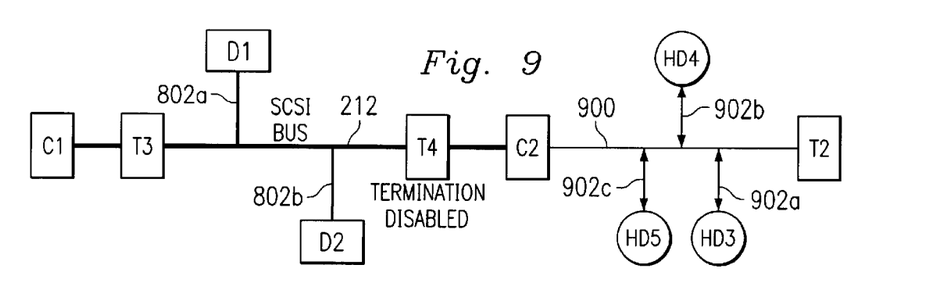
FIG. 9 is a block diagram of a first alternative version of the SCSI bus of FIG. 8.

In FIG. 9, a cable 900 is connected to connector C2, such that cable 900 forms a portion of SCSI bus 212. Notably, in FIG. 9, SCSI bus 212 includes three terminators (i.e. terminators T2, T3 and T4). In FIG. 9, because a maximum of two terminators may be electrically enabled at any moment, terminator T4 is electrically disabled, and terminators T2 and T3 are electrically enabled, as discussed further hereinbelow in connection with FIGS. 12 through 15.

Although not shown in FIG. 9, each of SCSI devices HD3, HD4 and HD5 (which are hard drives) is connected to cable 900 through a respective associated connector. Up to sixteen SCSI devices (including hard drives HD3, HD4 and HD5, plus devices D1 and D2 which may also, for example, be hard drives) may be so connected to SCSI bus 212. The maximum physical length of any of stubs 902*a*, 902*b* and 902*c* is restricted to 0.1 meter, such as between SCSI device HD3 and its respective associated connector to the bus path of SCSI bus 212.

As shown in FIG. 9, the portion of SCSI bus 900 between terminator T3 and terminator T2 is fully bounded by terminators. Accordingly, such portion forms a bus path, and cable 900 may have a physical length substantially greater than 0.1 meter.

Figure 10:
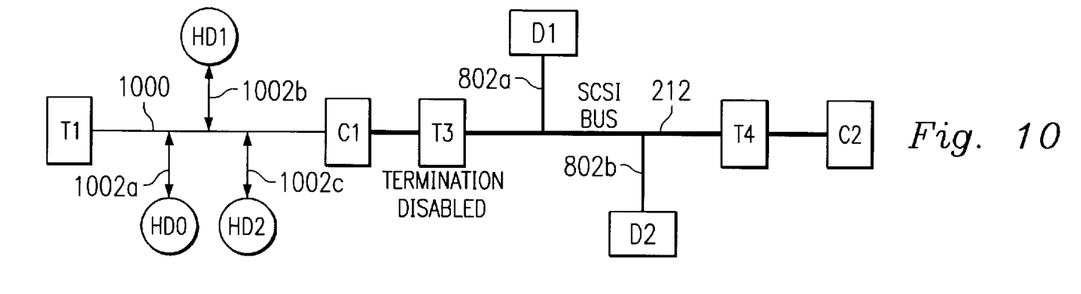
FIG. 10 is a block diagram of a second alternative version of the SCSI bus of FIG. 8.

In FIG. 10, a cable 1000 is connected to connector C1, such that cable 1000 forms a portion of SCSI bus 212. Notably, in FIG. 10, SCSI bus 212 includes three terminators (i.e. terminators T1, T3 and T4). In FIG. 10, because a maximum of two terminators may be electrically enabled at any moment, terminator T3 is electrically disabled, and terminators T1 and T4 are electrically enabled, as discussed further hereinbelow in connection with FIGS. 12 through 15.

Although not shown in FIG. 10, each of SCSI devices HD0, HD1 and HD2 (which are hard drives) is connected to cable 1000 through a respective associated connector. Up to sixteen SCSI devices (including hard drives HD0, HD1 and HD2, plus devices D1 and D2 which may also, for example, be hard drives) may be so connected to SCSI bus 212. The maximum physical length of any of stubs 1002*a*, 1002*b* and 1002*c* is restricted to 0.1 meter, such as between SCSI device HD0 and its respective associated connector to the bus path of SCSI bus 212.

As shown in FIG. 10, the portion of SCSI bus 212 between terminator T4 and terminator T1 is fully bounded by terminators. Accordingly, such portion forms a bus path, and cable 1000 may have a physical length substantially greater than 0.1 meter.

Figure 11:
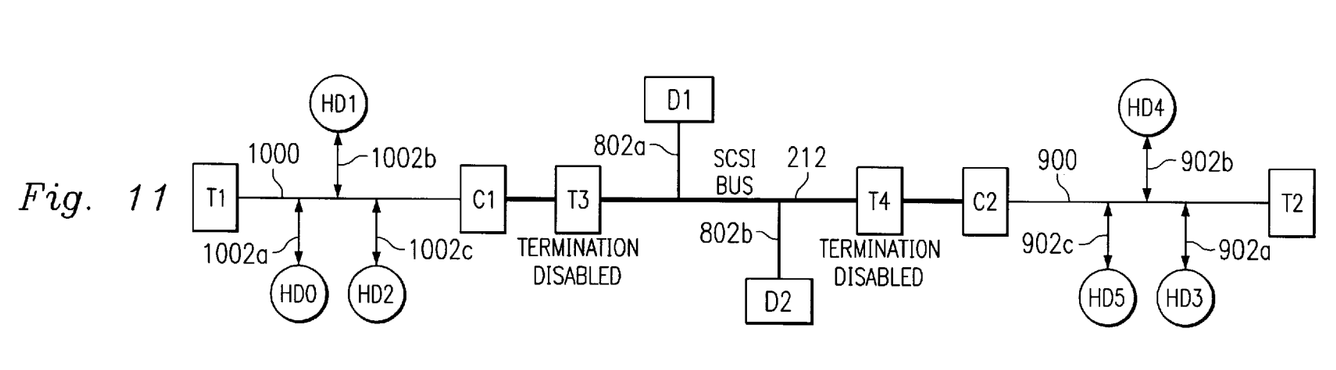
FIG. 11 is a block diagram of a third alternative version of the SCSI bus of FIG. 8.

In FIG. 11, cable 900 (of FIG. 9) is connected to connector C2, and cable 1000 (of FIG. 10) is connected to connector C1, such that cables 900 and 1000 form a portion of SCSI bus 212. Notably, in FIG. 11, SCSI bus 212 includes four terminators (i.e. terminators T1, T2, T3 and T4). In FIG. 11, because a maximum of two terminators may be electrically enabled at any moment, terminators T3 and T4 are electrically disabled, and terminators T1 and T2 are electrically enabled, as discussed further hereinbelow in connection with FIGS. 12 through 15.

As shown in FIG. 11, the portion of SCSI bus 212 between terminator T1 and terminator T2 is fully bounded by terminators. Accordingly, such portion forms a bus path, and cables 900 and 1000 are not restricted to a maximum physical length of 0.1 meter. Nevertheless, the maximum physical length between T3 and C1, and likewise between T4 and C2, is restricted to 0.1 meter, in order to preserve the option of either attaching or detaching cables 900 and/or 1000 under various situations as shown in FIGS. 8 through 11. Advantageously, however, unlike SCSI bus 400 (of FIGS. 4 through 7), this restriction does not impose undesirable limits on the number of SCSI devices that may be connected to SCSI bus 212 between connectors C1 and C2. This is because the portion of SCSI bus 212 between terminators T3 and T4 forms a bus path, which may have a physical length substantially greater than 0.1 meter.

Figure 12:
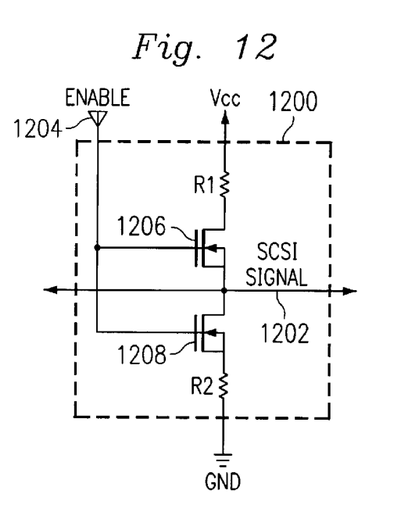
FIG. 12 is a schematic electrical circuit diagram of a first terminator of the SCSI bus of FIG. 8.

FIG. 12 is a schematic electrical circuit diagram of a terminator 1200 of SCSI bus 212. More specifically, terminator 1200 is a single ended ("SE") terminator for a line 1202 (of SCSI bus 212) that communicates an SE signal. In response to an enable line 1204 having a logic 1 true state, each of transistors 1206 and 1208 is substantially turned on, so that line 1202 is electrically coupled (a) to a voltage reference node GND through transistor 1208 and a resistor R2 and (b) to a voltage supply node Vcc (having a voltage equal to approximately 5 volts relative to GND) through transistor 1206 and a resistor R1. Conversely, in response to enable line 1204 having a logic 0 false state, each of transistors 1206 and 1208 is substantially turned off, so that line 1202 is electrically decoupled from GND and Vcc. For clarity, Vcc, GND and enable line 1204 are not shown in FIGS. 2 through 11.

Figure 13:
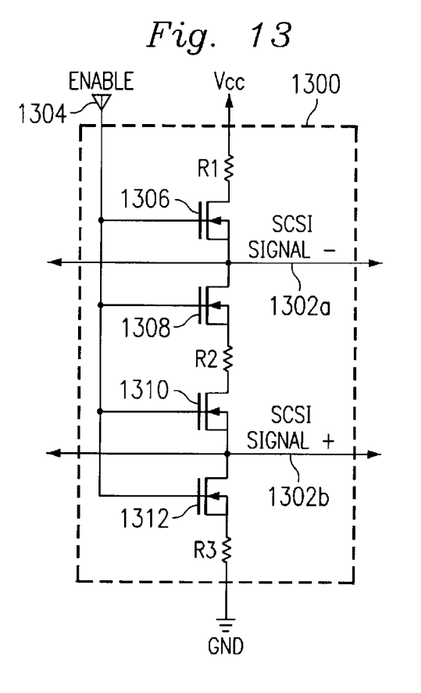
FIG. 13 is a schematic electrical circuit diagram of a second terminator of the SCSI bus of FIG. 8.

FIG. 13 is a schematic electrical circuit diagram of a terminator 1300 of SCSI bus 212. More specifically, terminator 1300 is a low voltage differential ("LVD") terminator for a pair of lines 1302a and 1302b (of SCSI bus 212) that together communicate an LVD signal. In response to an enable line 1304 having a logic 1 true state, each of transistors 1306, 1308, 1310 and 1312 is substantially turned on, so that:

line 1302a is electrically coupled (a) to Vcc through transistor 1306 and a resistor R1 and (b) to line 1302b through transistor 1308, a resistor R2, and transistor 1310; and line 1302b is electrically coupled (a) to GND through transistor 1312 and resistor R3 and (b) to line 1302a through transistor 1310, resistor R2, and transistor 1308. Notably, transistor 1308, resistor R2, and transistor 1310 are electrically interposed between line 1302a and line 1302b. Accordingly, line 1302a is capable of having a voltage that is significantly different from a voltage of line 1302b.

Conversely, in response to enable line 1304 having a logic 0 false state, each of transistors 1306, 1308, 1310 and 1312 is substantially turned off, so that lines 1302a and 1302b are electrically decoupled from GND and Vcc. For clarity, Vcc, GND and enable line 1304 are not shown in FIGS. 2 through 11.

Figure 14:
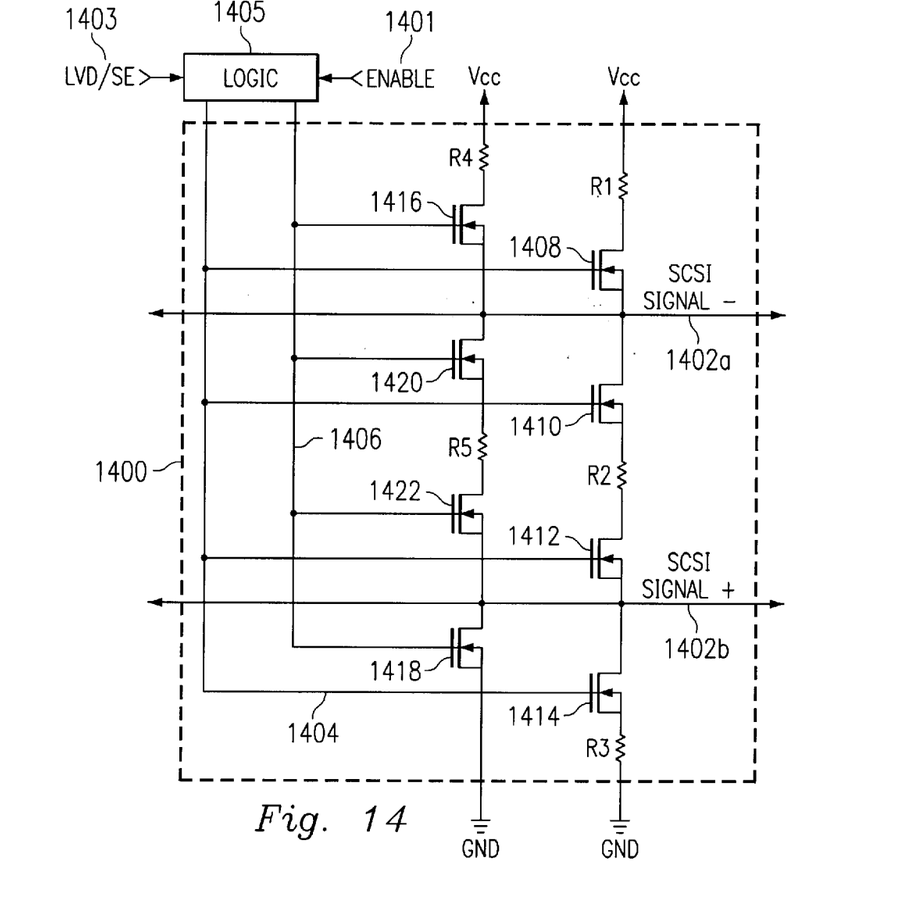
FIG. 14 is a schematic electrical circuit diagram of a third terminator of the SCSI bus of FIG. 8.

FIG. 14 is a schematic electrical circuit diagram of a terminator 1400 of SCSI bus 212. More specifically, terminator 1400 is a multimode terminator for a pair of lines 1402a and 1402b (of SCSI bus 212) that together communicate either an LVD signal or an SE signal. In response to an LVD/SE line 1403 having a logic 1 true state, terminator 1400 operates in an LVD mode, and lines 1402a and 1402b together communicate an LVD signal. Conversely, in response to LVD/SE line 1403 having a logic 0 false state, terminator 1400 operates in an SE mode, and lines 1402a and 1402b together communicate an SE signal, such that: (a) line 1402b is electrically coupled to GND as discussed further hereinbelow; and (b) line 1402a communicates the SE signal relative to GND (i.e. relative to line 1402b).

Accordingly, in response to an enable line 1401 having a logic 1 true state and LVD/SE line 1403 having a logic 1 true state (i.e. LVD mode), logic 1 405 operates (a) a line 1404 to have a logic 1 true state and (b) a line 1406 to have a logic 0 false state. In that manner, each of transistors 1408, 1410, 1412 and 1414 is substantially turned on, and each of transistors 1416, 1418, 1420 and 1422 is substantially turned off, so that:

line 1402a is electrically coupled (a) to Vcc through transistor 1408 and a resistor R1 and (b) to line 1402b through transistor 1410, a resistor R2, and transistor 1412; and line 1402b is electrically coupled (a) to GND through transistor 1414 and resistor R3 and (b) to line 1402a through transistor 1412, resistor R2, and transistor 1410. Notably, transistor 1410, resistor R2, and transistor 1412 are electrically interposed between line 1402a and line 1402b. Accordingly, line 1402a is capable of having a voltage that is significantly different from a voltage of line 1402b.

Conversely, in response to an enable line 1401 having a logic 0 false state, logic 1 405 operates each of lines 1404 and 1406 to have a logic 0 false state, irrespective of whether LVD/SE line 1403 has a logic 0 false state or logic 1 true state. In that manner, each of transistors 1408, 1410, 1412, 1414, 1416, 1418, 1420 and 1422 is substantially turned off, so that lines 1402a and 1402b are electrically decoupled from GND and Vcc.

By comparison, in response to enable line 1401 having a logic 1 true state and LVD/SE line 1403 having a logic 0 false state (i.e. SE mode), logic 1 405 operates (a) line 1404 to have a logic 0 false state and (b) line 1406 to have a logic 1 true state. In that manner, each of transistors 1416, 1418, 1420 and 1422 is substantially turned on, and each of transistor 1408, 1410, 1412 and 1414 is substantially turned off so that:

line 1402a is electrically coupled (a) to Vcc through transistor 1416 and a resistor R4, and (b) to line 1402b through transistor 1420, a resistor R5, and transistor 1422; and line 1402b is electrically coupled (a) to GND through transistor 1418 and (b) to line 1402a through transistor 1422, resistor R5, and transistor 1420. For clarity, Vcc, GND, enable line 1401, LVD/SE line 1403 and logic 1 405 are not shown in FIGS. 2 through 11.

Figure 15:
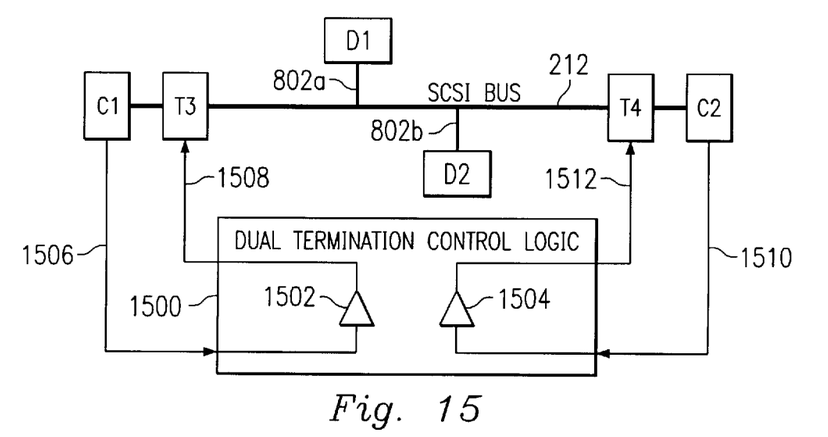
FIG. 15 is a block diagram of the SCSI bus of FIGS. 8 through 11.

FIG. 15 is a block diagram of SCSI bus 212 of FIGS. 8 through 11. For clarity, dual termination control logic 1 500 is not shown in FIGS. 8 through 11. Nevertheless, logic 1 500 is present in the versions of SCSI bus 212 that are shown and described hereinabove in connection with FIGS. 8 through 11.

As shown in FIG. 15, logic 1 500 includes a first buffer/driver 1502 and a second buffer/driver 1504. Buffer/driver 1502 receives a first signal from a line 1506 and, in response thereto, outputs a second signal (logically identical to the first signal) on a line 1508. Likewise, buffer/driver 1504 receives a first signal from a line 1510 and, in response thereto, outputs a second signal (logically identical to the first signal) on a line 1512.

Line 1506 is connected between connector C1 and buffer/driver 1502. Line 1508 is connected between buffer/driver 1502 and the enable line of terminator T3. In response to cable 1000 (FIG. 10) being disconnected from connector C1, connector C1 operates line 1506 to have a logic 1 true state. In response thereto, buffer/driver 1502 operates line 1508 to have a logic 1 true state, thereby enabling terminator T3 as discussed hereinabove.

Conversely, in response to cable 1000 (FIG. 10) being connected to connector C1, connector C1 operates line 1506 to have a logic 0 false state. In response thereto, buffer/driver 1502 operates line 1508 to have a logic 0 false state, thereby disabling terminator T3 as discussed hereinabove.

Similarly, line 1510 is connected between connector C2 and buffer/driver 1504. Line 1512 is connected between buffer/driver 1504 and the enable line of terminator T4. In response to cable 900 (FIG. 9) being disconnected from connector C2, connector C2 operates line 1510 to have a logic 1 true state. In response thereto, buffer/driver 1504 operates line 1512 to have a logic 1 true state, thereby enabling terminator T4 as discussed hereinabove.

Conversely, in response to cable 900 (FIG. 9) being connected to connector C2, connector C2 operates line 1510 to have a logic 0 false state. In response thereto, buffer/driver 1504 operates line 1512 to have a logic 0 false state, thereby disabling terminator T4 as discussed hereinabove.

In an alternative embodiment, line 1506 is directly connected to line 1508 (and thereby to the enable line of terminator T3), without buffer/driver 1502 being interposed between them.

In yet another alternative embodiment, buffer/driver 1502 is replaced by a first inverter, and buffer/driver 1504 is replaced by a second inverter. In such an alternative embodiment, terminator T3 is modified to be enabled in response to line 1508 having a logic 0 false state and to be disabled in response to line 1508 having a logic 1 true state. Likewise, in such an alternative embodiment, terminator T4 is modified to be enabled in response to line 1512 having a logic 0 false state and to be disabled in response to line 1512 having a logic 1 true state.

Figure 16:
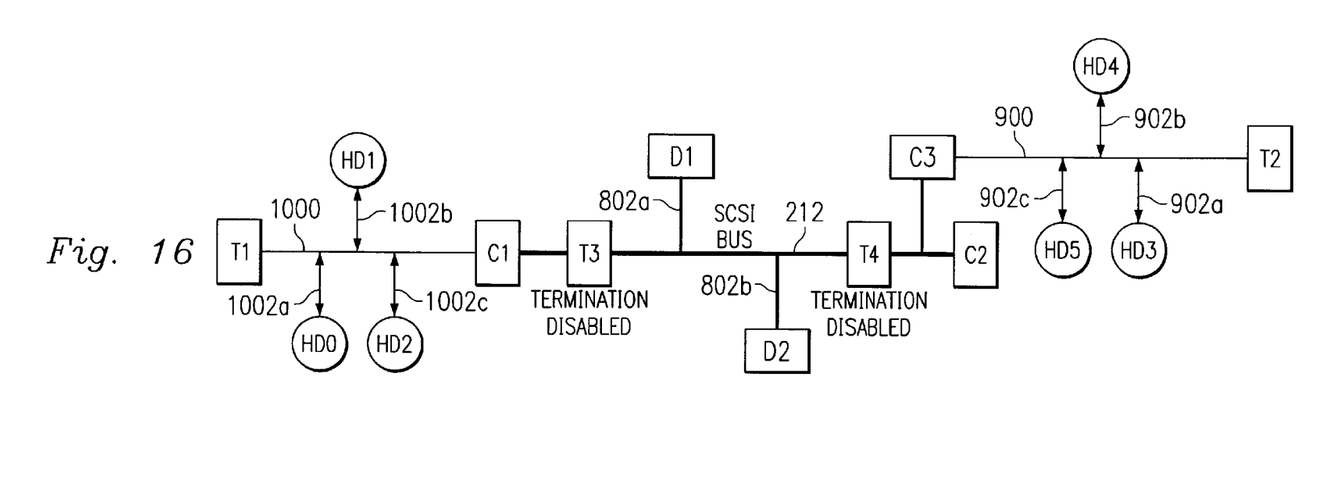
FIG. 16 is a block diagram of an alternative version of the SCSI bus of FIG. 11.

FIG. 16 is a block diagram of an alternative version of SCSI bus 212 of FIG. 11. Unlike FIG. 11, SCSI bus 212 of FIG. 16 has an additional connector C3. The portion of SCSI bus 212 between terminator T4 and connector C3 is not fully bounded by terminators, because connector C3 is not interposed between terminator T4 and a second terminator. Accordingly, such portion forms a stub with a maximum physical length restricted to 0.1 meter. Also, unlike FIG. 11, cable 900 of SCSI bus 212 in FIG. 16 is connected to connector C3 instead of connector C2.

Figure 17:
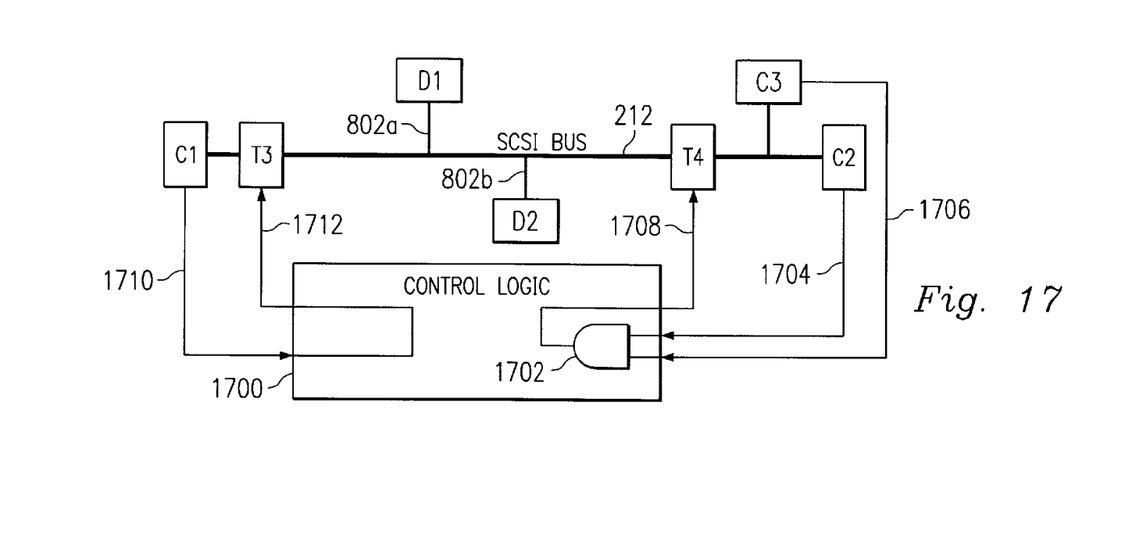
FIG. 17 is a block diagram of the SCSI bus of FIG. 16.

FIG. 17 is a block diagram of SCSI bus 212 of FIG. 16. For clarity, control logic 1 700 is not shown in FIG. 16. Nevertheless, logic 1 700 is present in the version of SCSI bus 212 that is shown and described hereinabove in connection with FIG. 16.

As shown in FIG. 17, logic 1 700 includes an AND gate 1702 that receives a first signal from a line 1704 and a second signal from a line 1706. In response to the first and second signals, AND gate 1702 outputs a third signal (logically ANDed in response to the first and second signals) on a line 1708.

Through logic 1 700, a line 1710 is directly connected to a line 1712. In that manner, an output of connector C1 is directly connected to the enable line of terminator T3.

In the embodiment of FIG. 17, connector C1 operates line 1710 to have (a) a logic 1 true state in response to cable 1000 (FIG. 10) being disconnected from connector C1, thereby enabling terminator T3 as discussed hereinabove, and (b) a logic 0 false state in response to cable 1000 (FIG. 10) being connected to connector C1, thereby disabling terminator T3 as discussed hereinabove.

Similarly, connector C2 operates line 1704 to have (a) a logic 1 true state in response to cable 900 (FIG. 9) being disconnected from connector C2 and (b) a logic 0 false state in response to cable 900 (FIG. 9) being connected to connector C2. Also, connector C3 operates line 1706 to have (a) a logic 1 true state in response to cable 900 (FIG. 9) being disconnected from connector C3 and (b) a logic 0 false state in response to cable 900 (FIG. 9) being connected to connector C3.

Line 1704 is connected between connector C2 and AND gate 1702, and line 1706 is connected between connector C3 and AND gate 1702. Line 1708 is connected between AND gate 1702 and the enable line of terminator T4.

Accordingly, if cable 900 is disconnected from both connectors C2 and C3, then logic 1700 enables terminator T4. Conversely, if cable 900 is connected to either connector C2 or connector C3, then logic 1 700 disables terminator T4 as discussed further hereinbelow.

In the illustrative embodiment, each connector of SCSI bus 212 is either a 68-pin connector for a wide bus or a 50-pin connector for a narrow bus. The 68-pin wide bus includes "high byte" signals and "low byte" signals, whereas the 50-pin narrow bus includes only the low byte signals. The low byte signals include data signals D0 through D7 (which form an 8-bit data bus), plus control signals and a low byte parity signal. The high byte signals include data signals D8 through D15 (which, in addition to data signals D0 through D7, form a 16-bit data bus), plus a high byte parity signal.

SCSI bus 212 of FIG. 17 includes terminator circuitry (e.g. the circuitry of FIG. 14) for each signal of SCSI bus 212. Accordingly, because the wide bus includes nine signals additional to the narrow bus, each terminator of the wide bus includes nine instances of terminator circuitry (e.g. the circuitry of FIG. 14) additional to the instances of terminator circuitry that are included in the narrow bus.

As discussed hereinabove in connection with FIG. 14, each signal is communicated by two lines. Accordingly, because the high byte signals include nine signals additional to the low byte signals, the wide bus (68-pin connector) has eighteen lines additional to the narrow bus (50-pin connector).

In the example of FIG. 17, C2 is a 68-pin connector, and C3 is a 50-pin connector. If cable 900 is disconnected from both connectors C2 and C3, then logic 1 700: (a) enables all portions of terminator T4 that communicate high byte signals; and (b) enables all portions of terminator T4 that communicate low byte signals. If cable 900 is connected to connector C2 and disconnected from connector C3, then logic 1 700: (a) disables all portions of terminator T4 that communicate high byte signals; and (b) disables all portions of terminator T4 that communicate low byte signals. If cable 900 is connected to connector C3 and disconnected from connector C2, then logic 1 700: (a) enables all portions of terminator T4 that communicate high byte signals; and (b) disables all portions of terminator T4 that communicate low byte signals. The enabling and disabling is performed as discussed further hereinabove, as for example in connection with FIG. 14.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and go in a manner consistent with the scope of the embodiments disclosed herein.

What is claimed is:

1. A computer system, comprising:
   a bus including at least a pair of terminators interposed between a pair of connectors, a first one of the terminators being located within a predetermined distance from a first one of the connectors, and a second one of the terminators being located within the predetermined distance from a second one of the connectors; and
   circuitry for selectively disabling the second terminator in response to the second terminator being interposed between the first terminator and a third terminator of the bus and for selectively disabling the first terminator in response to the first terminator being interposed between the second terminator and a fourth terminator of the bus.

2. The computer system of claim 1 wherein the first and second terminators are located more than the predetermined distance away from one another.

3. The computer system of claim 1 wherein the bus is a small computer system interface ("SCSI") bus.

4. The computer system of claim 1 wherein the second connector is interposed between the second and third terminators.

5. The computer system of claim 1 and comprising a third connector of the bus, the pair of terminators being interposed between the first connector and the third connector, and the second terminator being located within the predetermined distance from the third connector.

6. The computer system of claim 5 wherein the third connector is interposed between the second and third terminators.

7. The computer system of claim 1 wherein the first connector is interposed between the first and fourth terminators.

8. The computer system of claim 1 wherein the predetermined distance is 0.1 meter.

9. A method for connecting electronic circuitry in a computer system, comprising the steps of:
   in a bus including at least a pair of terminators interposed between a pair of connectors, a first one of the terminators being located within a predetermined distance from a first one of the connectors, and a second one of the terminators being located within the predetermined distance from a second one of the connectors, selectively disabling the second terminator in response to the second terminator being interposed between the first terminator and a third terminator of the bus, and selectively disabling the first terminator in response to the first terminator being interposed between the second terminator and a fourth terminator of the bus.

10. The method of claim 9 wherein selectively disabling comprises the step of:
    selectively disabling the second terminator in response to the second terminator being interposed between the first terminator and the third terminator, the first and second terminators being located more than the predetermined distance away from one another.

11. The method of claim 9 wherein selectively disabling comprises the step of:
    selectively disabling the second terminator in response to the second terminator being interposed between the first terminator and the third terminator, the bus being a small computer system interface ("SCSI") bus.

12. The method of claim 9 wherein selectively disabling comprises the step of:
    selectively disabling the second terminator in response to the second terminator being interposed between the first terminator and the third terminator, the second connector being interposed between the second and third terminators.

13. The method of claim 9 wherein selectively disabling comprises the step of:
    selectively disabling the second terminator in response to the second terminator being interposed between the first terminator and the third terminator, the bus including a third connector, the pair of terminators being interposed between the first connector and the third connector, and the second terminator being located within the predetermined distance from the third connector.

14. The method of claim 13 wherein selectively disabling comprises the step of:
    selectively disabling the second terminator in response to the second terminator being interposed between the first terminator and the third terminator, the third connector being interposed between the second and third terminators.

15. The method of claim 9 wherein selectively disabling comprises the step of:
    selectively disabling the first terminator in response to the first terminator being interposed between the second terminator and the fourth terminator, the first connector being interposed between the first and fourth terminators.

16. The method of claim 9 wherein selectively disabling comprises the step of:
    selectively disabling the second terminator in response to the second terminator being interposed between the first terminator and the third terminator, the predetermined distance being 0.1 meter.

17. A computer system, comprising:
    a small computer system interface ("SCSI") bus including at least a pair of terminators interposed between a pair of connectors, a first one of the terminators being located within a predetermined distance from a first one of the connectors, and a second one of the terminators being located within the predetermined distance from a second one of the connectors, the first and second terminators being located more than the predetermined distance away from one another; and
    circuitry for:
      selectively disabling the second terminator in response to the second terminator being interposed between the first terminator and a third terminator of the bus, the second connector being interposed between the second and third terminators; and
      selectively disabling the first terminator in response to the first terminator being interposed between the second terminator and a fourth terminator of the bus, the first connector being interposed between the first and fourth terminators.

18. The computer system of claim 17 and comprising a third connector of the bus, the pair of terminators being interposed between the first connector and the third connector, and the second terminator being located within the predetermined distance from the third connector.

19. The computer system of claim 18 wherein the third connector is interposed between the second and third terminators.

20. The computer system of claim 17 wherein the predetermined distance is 0.1 meter.

* * * * *